United States Patent [19]
Bedi

[11] 3,818,525
[45] June 25, 1974

[54] SELF-LOCKING FASTENER
[75] Inventor: Ram D. Bedi, Southfield, Mich.
[73] Assignee: Eaton Corporation, Cleveland, Ohio
[22] Filed: Mar. 8, 1971
[21] Appl. No.: 121,664

[52] U.S. Cl. .......... 10/27 R, 10/10 P, 151/14 R
[51] Int. Cl. ............... B21k 1/44, B23g 9/00
[58] Field of Search ........... 10/10, 27, 86 A, 10 P; 117/50, 105; 151/7, 14 R, 14.5; 85/1 C

[56] References Cited
UNITED STATES PATENTS
| 189,984 | 4/1877 | Wright | 151/14.5 |
| 1,137,941 | 5/1915 | Woodward | 151/14.5 |
| 3,400,010 | 9/1968 | Keating | 117/105 |
| 3,552,467 | 1/1971 | Bergere | 151/14 R |
| 3,579,684 | 5/1971 | Duffy | 10/10 P |

FOREIGN PATENTS OR APPLICATIONS
26,071  4/1914  Great Britain .......... 85/1 C

Primary Examiner—Charles W. Lanham
Assistant Examiner—E. M. Combs
Attorney, Agent, or Firm—Teagno & Toddy

[57] ABSTRACT

Self-locking fasteners, and method of making same; more particularly, metal fasteners wherein the self-locking characteristic is derived from a patch comprising a metal or metal alloy selectively applied to the surface of the metal fastener in a spraying operation.

10 Claims, 4 Drawing Figures

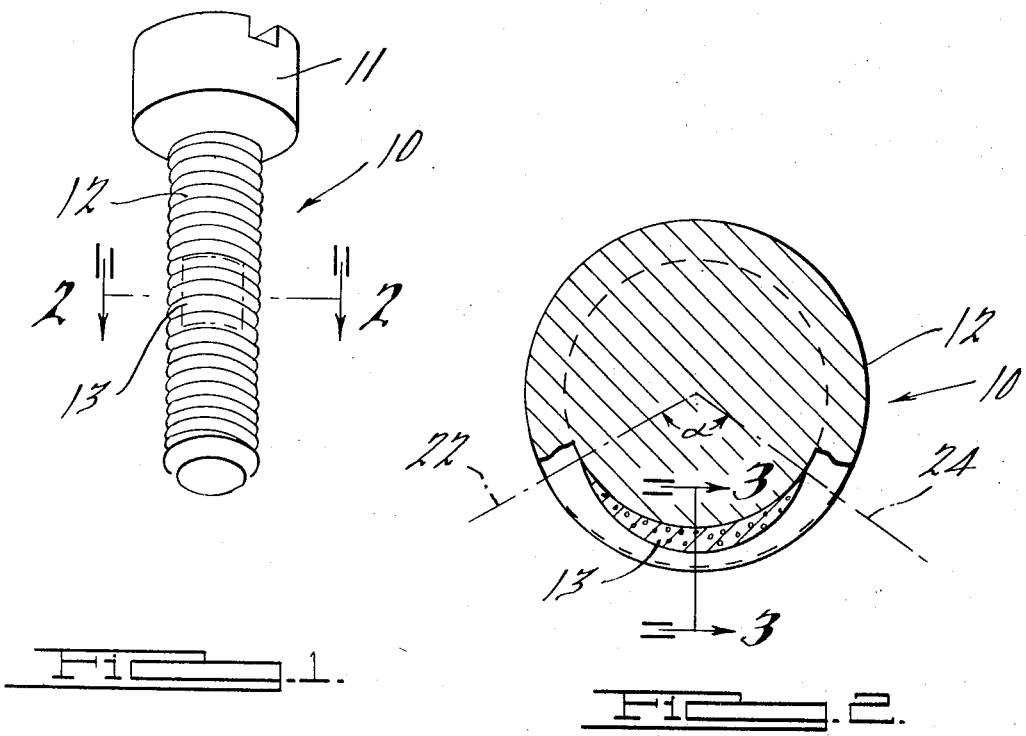
FIG. 1.
FIG. 2.
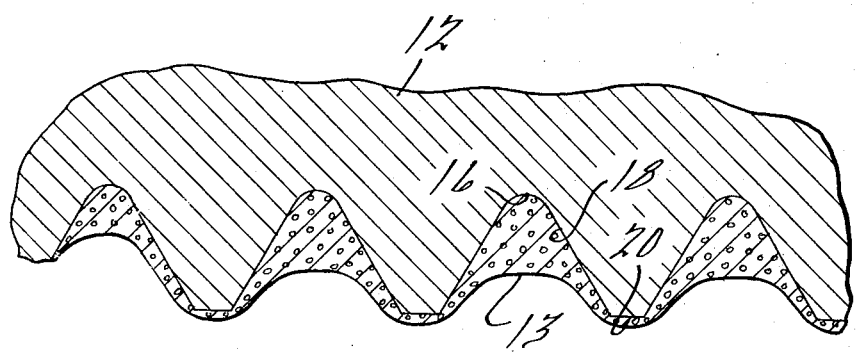
FIG. 3.
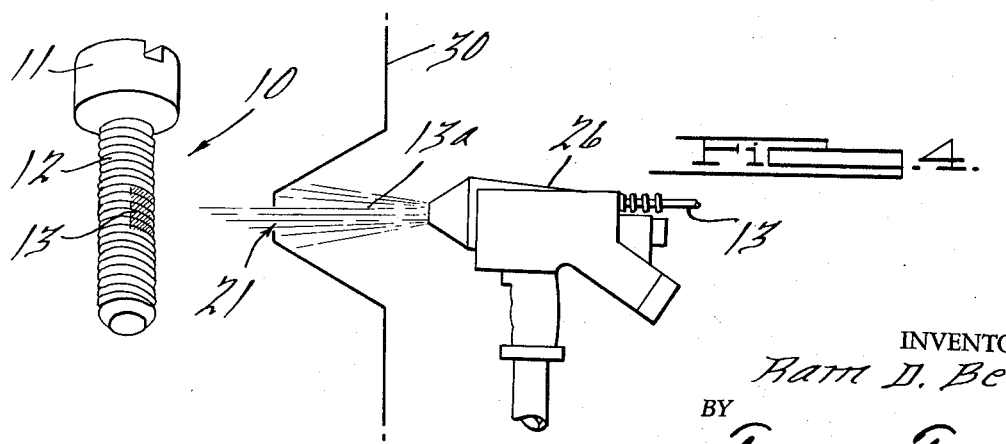
FIG. 4.
INVENTOR.
Ram D. Bedi.
BY Teagno & Toddy
ATTORNEY.

SELF-LOCKING FASTENER

BACKGROUND OF THE INVENTION

This invention relates to self-locking fasteners. A variety of self-locking fasteners using plastic patch material have heretofore been used or proposed for use. Each of these prior art fasteners utilizes the elastic memory of the plastic material to maintain an adequate locking torque over a number of reuses of the fastener. While these plastic patch fasteners have been generally satisfactory in normal usage, their usage has been somewhat limited or impaired by the relatively low modulus of elasticity of the plastic patch, causing the patch to prematurely take a permanent set to preclude further use cycles, and by their relatively poor performance in high temperature environments or in applications involving the use of certain organic fluids (e.g., solvents). In particular, there has been heretofore a long felt need for an improved self-locking fastener having an improved reusability characteristic and/or having the ability to perform well at high temperatures and in the presence of organic fluids.

SUMMARY OF THE INVENTION

It is an object of the present invention to provide an improved self-locking fastener.

A further object is to provide an improved method of making a self-locking fastener.

A more specific object is to provide a self-locking fastener having improved resistance to high temperatures and organic fluids.

Yet another object is to provide a self-locking fastener having improved reusability characteristics.

According to an important feature of the invention method, a self-locking characteristic is imparted to a threaded metal fastener by cleaning at least part of the threaded portion of the fastener to expose a clean metal surface on that part, and thereafter spraying the clean surface with a molten metallic material to produce a relatively spongy or porous metallic patch on the threaded portion part.

According to another important feature of the invention, the cleaning operation comprises applying cleaning solvents to the fastener to remove soluble oils, grit blasting the fastener to remove iron oxides and to pit the fastener surface, air blasting the fastener to remove residual grit from the grit blasting operation, and drying the fastener to remove moisture. The fastener is thereafter selectively sprayed with the metallic material to provide the self-locking patch.

In the disclosed embodiment of the invention, the metallic spray material comprises an alloy of copper and zinc and is applied to the fastener in a semi-molten particle form with a flame spray apparatus. The invention contemplates that the fasteners will be moved sequentially past the various pretreatment work stations, and thereafter past the metal spray work stations, in a production line operation.

The fastener according to the invention comprises a main body portion including a threaded portion of a first metallic material, and a spongy, porous patch of a second metallic material bonded to a portion of the threaded surface of the threaded portion. In the disclosed embodiment, the fastener comprises a bolt having a threaded shaft portion formed of a suitable steel, and the spongy patch material is bonded to the shaft portion and comprises an alloy of copper and zinc.

Further objects, features and advantages of the invention will become apparent from the detailed description of the preferred embodiment and from the accompanying drawing.

BRIEF DESCRIPTION OF THE DRAWING

In the drawing:

FIG. 1 is a perspective view of a self-locking fastener according to the invention;

FIG. 2 is a cross-sectional view taken on line 2—2 of FIG. 1;

FIG. 3 is an enlarged fragmentary view in longitudinal section taken on line 3—3 of FIG. 2 showing the distribution of a spongy metallic patch material along the threaded surface of the fastener; and FIG. 4 is a schematic view illustrating a spraying operation for applying the metallic patch material.

DESCRIPTION OF THE PREFERRED EMBODIMENT

The invention will be described in relation to a process for imparting a self-locking characteristic to a threaded metal fastener, and in relation to a threaded metal fastener produced by the invention process.

With reference to FIG. 1, the disclosed self-locking fastener comprises a threaded bolt 10 of standard form having a head portion 11, a threaded shaft portion 12, and a metallic patch 13 provided on a selected area of the threaded surface of shaft portion 12.

As seen in FIG. 3, the metallic patch 13 covers the valleys 16, the inclined helical bearing surfaces 18 and the crests 20 of the threaded surface of shaft portion 12. Patch 13 is so located as to be elastically deformed between the threaded surface of shaft portion 12 and mating threads of a complimentary element with which the bolt 10 is assembled to provide increased frictional resistance to undesired loosening of the threaded engagement between the bolt 10 and the complimentary element.

As best seen in FIG. 2, the exposed surface of the metallic patch 13 extends in a substantially continuous convex curve from one radial plane 22 to another radial plane 24. The included angle $\alpha$ between planes 22 and 24 is preferably greater than 90° and less than 180°. The radial thickness of the metallic patch 13 is greatest substantially midway between planes 22, 24 and gradually diminishes in radial thickness as it approaches the limiting radial planes so that the exposed surface of the metallic patch 13 forms only a small angle to a tangent to the threaded surfaces at the limiting radial planes. This tapered patch configuration is important since it allows easy engagement of the bolt 10 with a complimentary element while yet retaining superior resistance to undesired loosening of the resulting threaded engagement. Although the patch is shown to have a generally rectangular configuration, it will be apparent that various other configurational patch shapes may be employed.

In accordance with the process aspects of the present invention, all or a selected portion of the threaded shaft portion of the fastener is initially subjected to a pretreatment including various cleaning steps designed to remove any undesirable contaminants. Specifically, the fastener is first subjected to a brushing operation in which the threaded shaft portion is wire-brushed to remove any loose materials. Thereafter the fastener is subjected to a solvent cleaning in which the shaft portion is cleaned with Trichlorethylene or Methyl Ethyle Ketone to remove any soluble oils. The preliminarily cleaned fastener thereafter undergoes a grit blasting treatment in which the threaded shaft portion is subjected to grit blasting with between 20 to 50 mesh aluminum oxide for about 3 to 5 seconds. After grit blasting, the fastener is air sprayed to remove any loose grit from the fastener, after which the fastener is preheated with an infrared lamp or other known heating device to about 200° to 220°F to evaporate any moisture from the fastener.

Following this pretreatment of the fastener, a metallic material is applied to the cleaned shaft portion in a spraying operation. The metallic material to be applied in the spraying operation preferably comprises a metal or metal alloy having a modulus of elasticity from $10 \times 10^6$ to $50 \times 10^6$. Particularly satisfactory results have been attained by applying such metallic materials as stainless steel, molybdenum, copper alloys, and carbon steel.

As seen in FIG. 4, the spraying equipment includes a flame spray gun 26 (not to scale). Metallic material 13 iw fed in wire form through spray gun 26 and is atomized by the gun to produce a metallic spray 13a. A mask 30 is positioned between the fastener 10 and the gun 26; mask 30 includes a central aperture 21 which functions to channel the metallic spray 13a onto a selected arcuate area on the threaded shaft portion 12 of a bolt 10 disposed opposite aperture 21 with its lengthwise axis essentially normal to the spray axis of gun 26. A metallic patch 13 is thus formed on the surface of threaded shaft portion 12 with the arcuate and axial extent of the patch being selectively predetermined by the configuration of opening 21 and the positioning of the gun 26 and bolt 10 relative to opening 21. The aforedescribed tapered configuration of the patch produces itself automatically by virtue of the circular shape of the bolt surface and the normal disposition of the bolt axis relative to the spray direction.

Flame spray guns suitable for carrying out the invention process are commercially available, for example, from the Colmonoy Division of the Wall Colmonoy Corporation of Detroit, Mich. While various Wall Colmonoy spray guns are suitable for the invention process, Colmonoy Wirespray Gun WG-550 has been found to be particularly well suited to the invention process.

The fasteners may also undergo one or more posttreating operations following the spraying operation. For example, the fasteners may be sized to ensure any desired patch thickness or configuration and/or the fasteners may be treated with a light coat of lubricating material such as molybdenum disulfide, SAE-30 oil, or wax.

Although the invention has been described thus far with reference to individual treatment of a single fastener, it will be understood that the invention process actually comprises a production line operation in which a plurality of brushing, cleaning, grit blasting, air spraying, preheating, metal spraying and post-treating work stations are serially arranged in a given work area and fasteners are sequentially moved past the successive stations to achieve mass production of the invention fasteners. For example, bolts 10 may be moved by a suitable conveyor facility successively past gun 26 with the axes of the bolts disposed normal to the spray gun axis and normal to the direction of movement of the bolts.

In order to further illustrate the process comprising the present invention, the following example is provided. It will be understood that this example is provided for illustration purposes only.

EXAMPLE NO. 1

A standard SAE 10-38 steel bolt was first brushed free of loose material by a wire brush, whereafter the bolt was cleaned with Trichlorethylene to remove oils. Next, the bolt was grit blasted with 46 mesh aluminum oxide for 3 seconds to remove iron oxides and to pit the threaded surface to provide a roughened surface for bonding. The bolt was then air blasted to remove any loose grit, whereafter the bolt was heated by an infrared lamp to 210°F to evaporate any moisture present. Next, a Colmonoy Wirespray Gun WG-550 was used to apply "Sprabronze C" to the prepared threaded surface. "Sprabronze C" is a 90 percent copper, 10 percent zinc copper alloy, available from Metco Inc. of Westburg, N.Y. The "Sprabronze C" was applied to the spray gun in wire form and exploded from the spray gun in a semi-molten metallic spray impinging the surface of the fastener and forming a metallic patch bonded to the threaded surface. The mask 30 was placed about 1 inch from the adjacent surface of fastener threaded shaft portion 12 and the spray gun was held with its tip between 3 to 5 inches from the mask 30. The bolt was sprayed with the "Sprabronze C" for 5 seconds, forming a continuous metallic patch 13 (FIG. 2) having a 10 to 20 mil thickness measured at the center of the patch and having a spongy, porous constitution by virtue of the spraying operation by which it was formed.

On cooling, the bolt was torque tested using standard steel nuts and the results are listed in the following table. This table also lists torque test results obtained with bolts having different metallic patch materials applied in accordance with the process described above. In each of the following cases, the standard nut was suitably secured, the test fastener was threaded into the nut and the maximum torque (identified in the table as MAXIMUM TORQUE, TIGHTENING) was recorded as the patch traversed the nut, whereafter the fastener was threaded out of the nut and the maximum torque (identified in the table as MAXIMUM TORQUE, LOOSENING) was recorded as the patch retraversed the nut. This completed the first test cycle. Subsequent test cycles followed an identical procedure.

| PATCH MATERIAL | MAX. TORQUE TIGHTENING in/lb | MAX. TORQUE LOOSENING in/lb | TEST CYCLE |
| --- | --- | --- | --- |
| "Sprabronze C" | 90 | 50 | 1st |
|  | 65 | 50 | 2nd |
|  | 50 | 35 | 3rd |
|  | 45 | 30 | 4th |
| Molybdenum (Metco Inc.) | 150 | 105 | 1st |
|  | 140 | 125 | 2nd |
|  | 125 | 110 | 3rd |
|  | 110 | 90 | 4th |
| "Wirespra No. 10" (a carbon steel available from | 95 | 55 | 1st |
|  | 65 | 50 | 2nd |
|  | 55 | 40 | 3rd |

| PATCH MATERIAL | MAX. TORQUE TIGHTENING in/lb | MAX. TORQUE LOOSENING in/lb | TEST CYCLE |
| --- | --- | --- | --- |
| Wall Colmonoy) | 40 | 25 | 4th |
| "Bronze A" (a bronze containing aluminum available from Wall Colmonoy) | 70 | 35 | 1st |
|  | 60 | 35 | 2nd |
|  | 55 | 35 | 3rd |
|  | 50 | 30 | 4th |
| "Walcoloy No. 1" (a 18-8 stainless steel available from Wall Colmonoy) | 95 | 65 | 1st |
|  | 55 | 50 | 2nd |
|  | 50 | 45 | 3rd |
|  | 40 | 30 | 4th |

It will be noted that the self-locking fasteners produced by the invention process retain their high resistance to loosening over a period of several use cycles and lose only a small fraction of their resistive ability with each successive cycle.

The self-locking fastener produced by the invention process is also superior to prior art plastic patch fasteners in its ability to retain its self-locking properties even in high temperature environments that would melt plastic patch fasteners and even in the presence of organic fluids that would attack plastic patch fasteners and destroy their retentive ability.

The self-locking fastener of the invention will thus be seen to provide excellent recycle capacity and superior resistance to adverse environmental conditions. The superior performance of the invention fastener in high temperature environments is shown by the following example.

EXAMPLE NO. 2

Two standard ⅜ × 16 steel bolts, one having a Sprabronze C patch material applied by the invention process and the other having a standard nylon insert applied by a commercial supplier, were placed in a furnace and heated to 800°F for 1 hour, whereafter the bolts were removed from the furnace and tested by the torque testing procedure previously described with the following results:

|  | MAXIMUM TORQUE TIGHTENING in/lb | MAXIMUM TORQUE LOOSENING in/lb | TEST CYCLE |
| --- | --- | --- | --- |
| Sprabronze C Patch | 150 | 140 | 1st |
|  | 125 | 85 | 2nd |
|  | 70 | 60 | 3rd |
|  | 70 | 80 | 4th |
|  | 70 | 75 | 5th |
|  | 60 | 55 | 6th |
| Nylon Insert | 0 | 0 | 1st |

The nylon insert on the nylon insert bolt charred badly during the heating operation and crumbled to a power when it was passed through the test nut on the first test cycle. The invention bolt continued to provide more than adequate resistance to loosening even after six test cycles.

The ability of the invention fastener to resist high temperature makes it particularly suitable for such high temperature applications as head bolts for internal combustion engines.

Although a preferred embodiment of the invention has been illustrated and described in detail with reference to a preferred embodiment, it will be understood that various changes and modifications may be made in the preferred embodiment without departing from the scope or spirit of the invention.

I claim:

1. A process for making a self-locking fastener comprising:
   a. providing a metal fastener having a threaded portion;
   b. selecting a metallic material having a modulus of elasticity less than the modulus of elasticity of the metal fastener; and
   c. spraying the metallic material in a molten state on a selected area of the circumference of the threads of the fastener to produce a resiliently deformable patch having an effective locking area extending circumferentially substantially less than 360° of the circumference of the fastener whereby the patch will bias the threads not covered by the effective locking area of the patch and diametrically opposed from the circumferential midpoint of the patch into direct engagement with threads of a complementary threaded element when the fastener is in threaded engagement with the complementary element.

2. A process according to claim 1 wherein:
   d. the provided metal fastener is steel; and
   e. the selected metallic material is brass.

3. A process according to claim 1 wherein the metallic material comprises a copper alloy containing about 90 percent copper and about 10 percent zinc.

4. A process according to claim 1 wherein the metallic material has a modulus of elasticity from $10 \times 10^6$ to $50 \times 10^6$.

5. A process for imparting a self-locking characteristic to a threaded metal fastener whose threads are intended for mating engagement with threads of a complementary element comprising:
   a. selecting a metallic material having a modulus of elasticity less than the modulus of elasticity of the threads of the fastener and the threads of the intended complementary element; and
   b. spraying the metallic material in a molten state on a selected area of the circumference of the threads of the fastener to produce a patch having an effective lacking area extending circumferentially substantially less than 360° of the circumference of the fastener for resilient engagement with the threads of the intended complementary element to bias the threads of the fastener not covered by the effective locking area of the patch and diametrically opposed from the circumferential midpoint of the patch into direct engagement with threads of the intended complementary element when the fastener and the intended complementary element are in threaded engagement.

6. A process according to claim 5 wherein the selected metallic material is brass.

7. A process for imparting a self-locking characteristic to the crests and valleys of the threads of a metal fastener comprising:

a. selecting a metallic material having a modulus of elasticity less than the modulus of elasticity of the threads of the fastener; and
b. spraying the metallic material in a molten state on a selected area of the threads of the fastener that is no more than 180° of the circumference of the threads to cover at least two adjacent crests and fill in the valley between adjacent covered crests, the metallic material in the valley being substantially thicker than the metallic material on the adjacent crests throughout the patch.

8. A process according to claim 7 wherein the spraying step comprises:
1. heating the metallic material to a molten state;
2. atomizing the molten metallic material; and
3. projecting the atomized molten metallic material onto the threads of the fastener.

9. A process for imparting a self-locking metallic patch to the crests and valleys of the threads of a metal fastener, the metallic patch having a modulus of elasticity less than the modulus of elasticity of the threads of the fastener, comprising:
a. atomizing the metallic material in a molten state, and
b. projecting the atomized metallic material onto a selected area of the threads of the fastener to form a substantially continuous convex curve of material between two radial planes having an included angle greater than 90° and not more than 180°, the convex curve of material having a radial thickness,
1. that is greatest substantially midway between the two radial planes,
2. that gradually diminishes from the midway point as the material approaches the radial planes in order that the exposed surface of the material forms only a small angle to a tangent to the surface of the threads at the radial planes, and
3. that is greater in the valleys than on the crests adjacent the valleys throughout the patch.

10. A process for imparting a self-locking metallic patch to the crests and valleys of the threads of a metal fastener, the patched threads being intended for mating engagement with threads of a complementary element, the metallic patch having a modulus of elasticity less than the modulus of elasticity of the threads of the fastener and the mating threads of the intended complementary element, comprising:
a. atomizing the metallic material, and
b. projecting the atomized metallic material in a molten state onto a selected area of the threads of the fastener to form a substantially continuous convex curve of material between two radial planes having an included angle greater than 90° and not more than 180°, the convex curve of material having a radial thickness,
1. that is greatest substantially midway between the two radial planes,
2. that gradually diminishes from the midway point as the material approaches the radial planes in order that the exposed surface of the material forms only a small angle to a tangent to the surface of the threads at the radial planes, and
3. that is greater in the valleys than on the crests adjacent the valleys throughout the patch.

* * * * *

UNITED STATES PATENT OFFICE
CERTIFICATE OF CORRECTION

Patent No. 3,818,525         Dated  June 25, 1974

Inventor(s)  Ram D. Bedi

It is certified that error appears in the above-identified patent and that said Letters Patent are hereby corrected as shown below:

Column 3, line 25, after "13" "iw" should read -- is --. Column 7, line 25, claim 9, after "material" insert -- in a molten state --; Column 7, line 23, after "material' cancel "in a molten state".

Signed and sealed this 1st day of October 1974.

(SEAL)
Attest:

McCOY M. GIBSON JR.
Attesting Officer

C. MARSHALL DANN
Commissioner of Patents